United States Patent [19]

Fougea

[11] 4,299,785
[45] Nov. 10, 1981

[54] INDUCED DRAFT COOLING TOWER WITH IMPROVED OUTER SUPPORT STRUCTURE

[75] Inventor: Bernard Fougea, Neuilly-sur-Seine, France

[73] Assignee: Coignet S.A., Paris, France

[21] Appl. No.: 161,356

[22] Filed: Jun. 20, 1980

[30] Foreign Application Priority Data

Jun. 20, 1979 [FR] France ............................... 79 15763

[51] Int. Cl.³ .............................................. B01F 3/04
[52] U.S. Cl. ...................................... 261/111; 52/245; 52/638; 261/DIG. 11
[58] Field of Search ............... 261/109, 111, DIG. 11, 261/DIG. 77; 165/DIG. 1; 52/245, 403, 637, 638

[56] References Cited

U.S. PATENT DOCUMENTS

| | | | |
|---|---|---|---|
| 2,732,190 | 1/1956 | Mart | 261/DIG. 11 |
| 3,226,894 | 1/1966 | Burchardt et al. | 261/DIG. 11 |
| 3,608,873 | 9/1971 | Furlong | 261/111 X |
| 3,648,990 | 3/1972 | Stoker et al. | 261/DIG. 11 |
| 3,834,681 | 9/1974 | Fordyce et al. | 261/111 |
| 3,870,773 | 3/1975 | Luzaich | 52/637 X |
| 4,032,604 | 6/1977 | Parkinson et al. | 261/111 |
| 4,042,651 | 8/1977 | Gaurois | 52/637 X |

FOREIGN PATENT DOCUMENTS

| | | |
|---|---|---|
| 546863 | 10/1959 | Belgium . |
| 2050303 | 4/1971 | Fed. Rep. of Germany . |
| 2220494 | 11/1973 | Fed. Rep. of Germany ........ 52/638 |
| 2226631 | 11/1974 | France . |
| 286798 | 3/1953 | Switzerland ......................... 52/637 |
| 630823 | 10/1949 | United Kingdom . |
| 805474 | 12/1958 | United Kingdom ....... 261/DIG. 11 |

Primary Examiner—Richard L. Chiesa
Attorney, Agent, or Firm—Diller, Ramik & Wight

[57] ABSTRACT

An improved annular support structure for the dispersion section including the hot water basin of a cooling tower. The annular outer structure comprises a plurality of sector-shaped independent, self-supporting and self-stabilized towers each comprising a pair of radial sides formed by a stack of superposed precast reinforced concrete portal frames and precast reinforced concrete right triangular bracing members extending between and supported on the uprights of spaced pairs of portal frames. Cantilevers extending from the outer uprights of the portal frames support precast concrete louvers. The hot water basin has part annular sections supported on beams aligned with the radial sides and spaced from one another by expansion joints.

20 Claims, 7 Drawing Figures

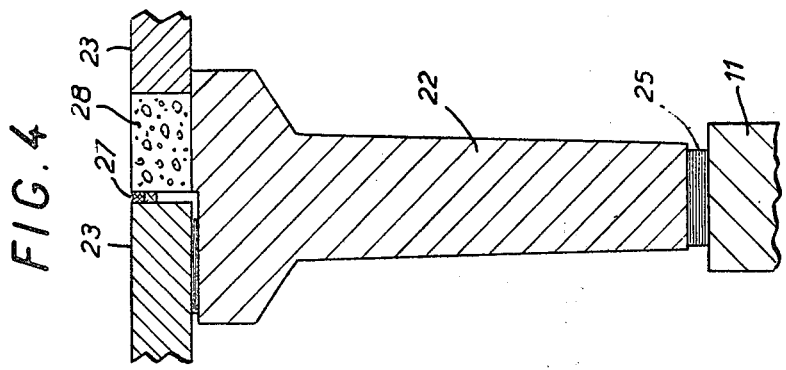
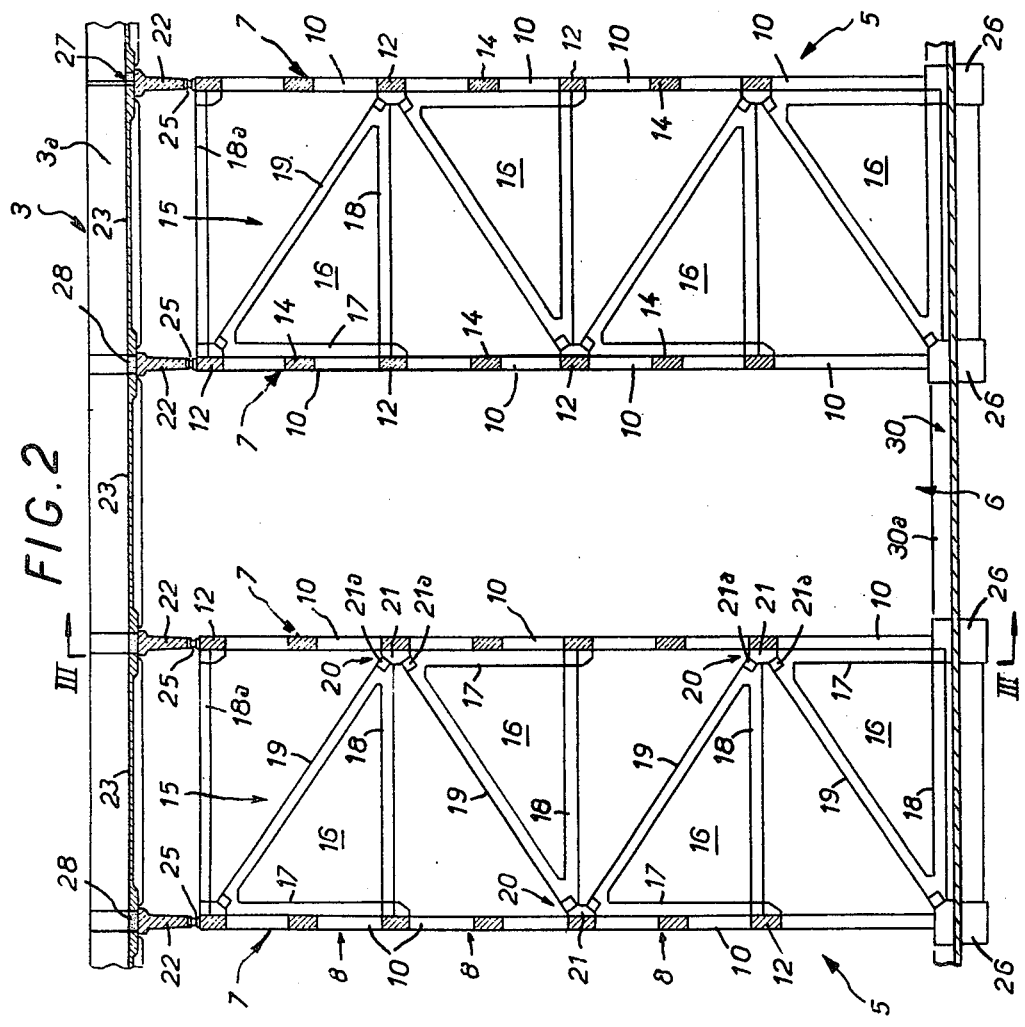

INDUCED DRAFT COOLING TOWER WITH IMPROVED OUTER SUPPORT STRUCTURE

The present invention relates to induced draft cooling towers and more particularly to the outer support structure of the cooling tower for supporting the dispersion section.

Such cooling towers are used for cooling the hot water from the condenser circuits of conventional or nuclear power plants. Present day cooling towers comprise a dispersion section including a raised, hot water supply basin to which hot water from the condenser circuits is delivered. The hot water is allowed to drop by gravity from the basin through fills or baffles where it is dispersed in air which is drawn from the periphery of the cooling tower and some of the water is evaporated reducing the temperature of the rest of the water. The moist air is drawn inwardly to the ventilation section by one or more diffusers or cells with exhaust blowers mounted therein and is carried upwards to the atmosphere. The rest of the water is collected in a cool water collector basin at a temperature about 10° C. less than that of the water in the raised, hot water supply basin.

The capacity of such cooling towers has grown over the years in accordance with the increase in size of power plants which are commonly today of the order of 900 megawatts. For such a power plant the cooling tower must be capable of dissipating about 3000 megawatts in cooling the hot condenser water. This calls for cooling towers of ever-increasing size.

But it is no longer possible to merely increase the size of conventional cooling tower structures which may have to exceed 170 meters in diameter and 30 meters in height without developing problems of stability of the supporting structure because of the fact that the maximum acceptable loads on the foundations have already been reached and the inevitable deformations of the components of such large scale structures are greater than those acceptable in conventional constructions. Furthermore these structures must be designed to withstand forces and shocks to earthquakes.

Large cooling towers are known, for example, those disclosed in French printed patent application No. 2,226,631 in which the outer support structure for the dispersion section comprises spaced apart radial trusses common to a pair of bays so as to define a complete monolithic structure over the entire periphery of the cooling tower which is defined by the interaction of the trusses of all the bays. Such a structure by its very construction therefore does not provide a solution to the deformation and earthquakes problems posed above.

British patent No. 630,820 discloses a monolithic cooling tower structure constructed by in situ pouring of concrete, which is much too small to satisfy the aforesaid cooling capacity requirements and therefore provides no solutions to the problems posed here.

Belgian patent No. 546,863 discloses a natural draft cooling tower in which precast tubular concrete elements are fixed to one another by tie rods which therefore define once again a structural dependent system unable to withstand forces due to earthquakes or cope with the deformation problem.

An object of the present invention is the provision of an outer support structure for a dispersion section of a cooling tower which overcomes or very substantially reduces the foregoing problems.

Another object of the present invention is the provision of an outer support structure of a cooling tower which comprises a plurality of independent self-supporting and self-stabilized towers.

A further object of the invention is to provide an outer support structure which is constructed essentially of precast reinforced concrete elements which may be standardized.

According to the invention there is provided an induced draft cooling tower of the type comprising an annular support structure for supporting a similarly shaped dispersion section including a raised, hot water supply basin and an inner support structure concentric with the outer support structure for supporting a ventilation section, the outer support structure being essentially constructed of precast reinforced concrete elements and comprising a plurality of sector-shaped independent, self-supporting and self-stabilized towers in an annular array, the towers having a pair of circumferentially spaced radial sides, each of the radial sides comprising a plurality of superposed portal frames, and triangular bracing members extending circumferentially between the pairs of radial sides of the towers.

Advantageously the upper cross members of the portal frame cantilever outwardly beyond their associated radially outer uprights to provide louver supports, the louvers of precast reinforced concrete being removably supported on the cantilevers.

The radial sides formed by the plurality of superposed portal frames may be assembled by bonding with adhesion or by fitting in one another. In the case of bonding with adhesion the relevant parts of the portal frames are placed on a patch of nonshrinking plastics material or resin.

According to a known method the radial sides are precast with interconnecting joints. One having ordinary skill in the art will understand that owing to the invention and suitable dimensioning these stacks of superposed portal frames are self-stabilized irrespective of the load applied and therefore it is not necessary to provide traction resistant connections between parts of the portal frames.

It will moreover be understood that owing to the present construction technique assembly is greatly simplied in that a small number of different precast reinforced concrete elements are utilized (essentially the portal frames and the bracing members) and small size in situ reinforced concrete joints are avoided.

Preferably, the triangular bracing members are right triangles, one side being parallel to the uprights and the other side being substantially perpendicular to the uprights; advantageously, the length of the one side is equal to the height of the uprights and the length of the other side is substantially equal to the distance between uprights of an associated pair of portal frames.

Owing to triangular bracing members buckling of the uprights of the portal frames is prevented. The diagonals or hypothenuses of the bracing members act in both compression and traction.

Preferably, the triangular bracing members are supported at their apices on radial ledges provided on circumferentially inner sides of their associated uprights. Preferably, the triangular bracing members have apical blocks bearing on the corresponding ledges and bolted thereto.

Preferably, the hot water supply basin comprises a plurality of independent part annular sections supported on the towers and separated from one another by expansion joints.

Advantageously the girders for supporting the part annular sections of the basin bear on their respective radial sides of the towers through neoprene pads for ensuring a uniform distribution of the horizontal forces on the different towers.

These and other features and advantages of the invention will be brought out in the description which follows, given by way of non-limiting example, of an embodiment of the invention with reference to the accompanying drawings, in which:

FIG. 2 is an elevational view taken on line II—II in FIG. 3 of two adjacent independent towers of the outer support structure;

FIG. 4 is an enlarged detail of a part of FIG. 2 showing the expansion joint and the neoprene bearing pad disposed between a radial girder for the supply basin and the immediately subjacent portal frame;

Figure 1:
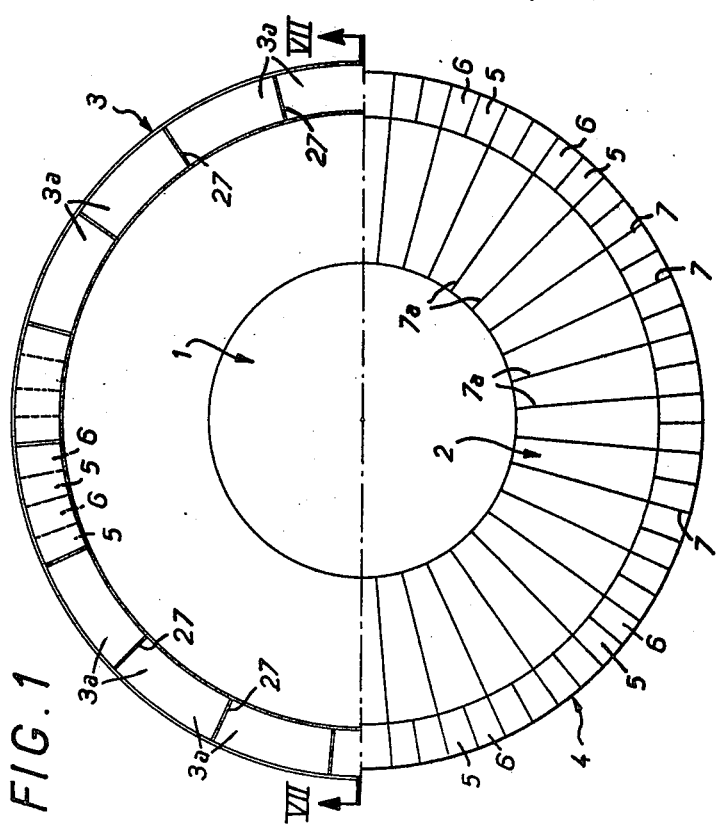
FIG. 1 is a schematic top plan view of a cooling tower, the lower half being in section.
Figure 7:
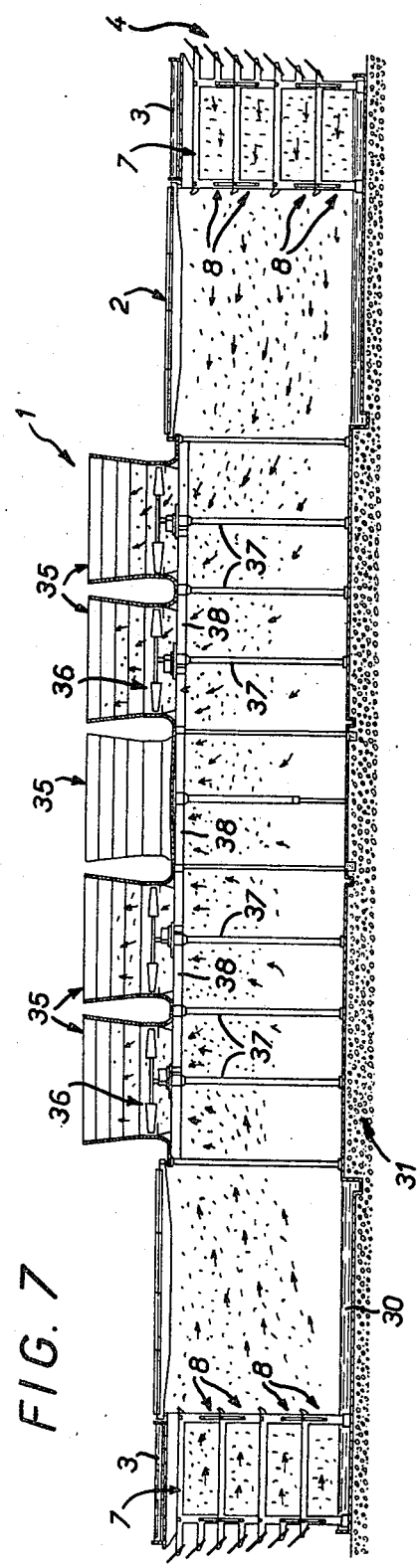
FIG. 7 is a schematic general elevational view in section of the entire cooling tower taken on line VII—VII in FIG. 1.

Reference will first be had to FIGS. 1 and 7 which schematically show the entire cooling tower embodying the invention. The cooling tower comprises an annular outer support structure 4 for supporting the dispersion section including a raised, hot water supply basin 3 and an annular array of independent towers 6 described in greater detail hereinbelow.

An annular connective roof 2 is hung between the outer support structure 4 and the inner support structure for the ventilation section 1. Preferably a peripheral joint is interposed between the outer support structure 4 and the roof 2 itself. The roof 2 is preferably made of asbestos concrete and is supported by radial beams 7a (see FIG. 1) and cross beams (not shown) interconnecting the beams 7a at radially spaced intervals.

The ventilation section comprises a plurality of diffusers or cells 35 having blower and drive means 36 for drawing the drawing hot moist air out of the cooling tower into the atmosphere. The support structure of the ventilation section 1 is arranged in hexagonal network of long columns 37 and beams 38 which together support the diffuser shells.

Suffice it to say hot water from the condensers of a nearby power plant is delivered to the open hot water supply basin 3. Hot water drops through orifices 23a in the basin 3 (see FIG. 5) or is sprayed into the dispersion section per se where baffles or fills are provided to slow the fall of water and assist evaporation by the air drawn between the louvers 13 at the outer periphery of the outer support structure 4. The moist air is then drawn by the blowers to the ventilation section and upwards and out the diffusers 35 into the atmosphere. The rest of the water eventually falls to the lower, cooler water basin 30 where it is recovered, the temperature of the water in the lower basin 30 being about 10° C. cooler than the water in the upper basin 3.

The actual construction of the fills or baffles is not part of the present invention and therefore will not be described in greater detail herein. Such arrangements are fully disclosed in the prior art literature and known to those skilled in the art.

The present invention is more particularly concerned with the annular outer support structure 4 for supporting the dispersion section including the raised, hot water supply basin 3.

Figure 6:
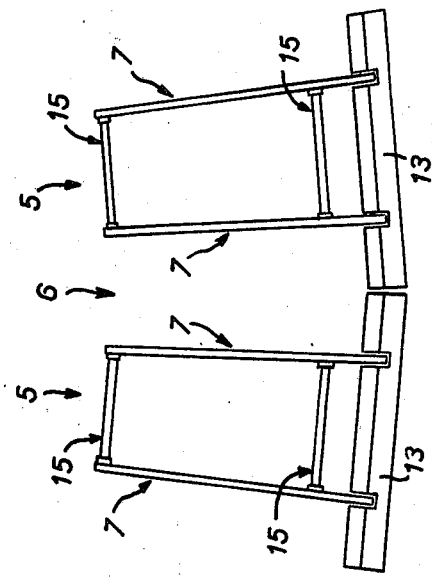
FIG. 6 is a schematic plan view of two adjacent towers with their louvers.

As mentioned above, and best seen in FIG. 1, the annular outer support structure 4 is made up of a plurality of sector-shaped independent towers 5 circumferentially alternating with sector-shaped spaces 6 (see FIGS. 1 and 6) of substantially the same dimensions. Each of the towers 5 defines an angle of 5° between its radial sides in the illustrated embodiment which corresponds to a total cooling tower diameter of 177 meters with 36 towers. The number and size of the towers will depend of course on the overall size and capacity of the installation.

Each of the towers 5 is supported on piles 26 embedded in a concrete foundation 31 and in accordance with the invention defines a self-supporting and self-stabilized structure described below. Each tower 5 comprises two radial sides 7 which are formed by a plurality of superposed precast reinforced concrete portal frames 8 including radially inner and outer uprights 9 and 10 connected by top cross member 11 (see FIGS. 3 and 5).

The cross member 11 extends outwardly beyond the outer upright 10 as a cantilever 12 for supporting a precast reinforced concrete louver 13 which is also supported by a similar cantilever of the other radial side of the tower. Preferably, the louver is removably mounted on its cantilever supports by suitable fittings.

Figure 3:
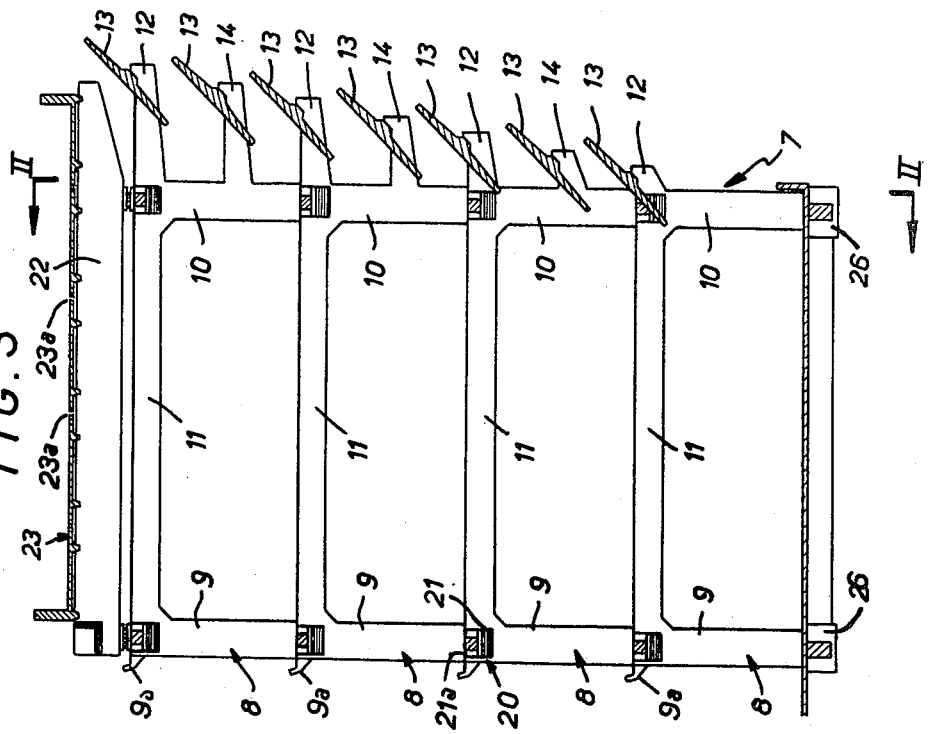
FIG. 3 is a sectional view taken on line III—III in FIG. 2 showing a plurality of superposed portal frames of a single tower.
Figure 5:
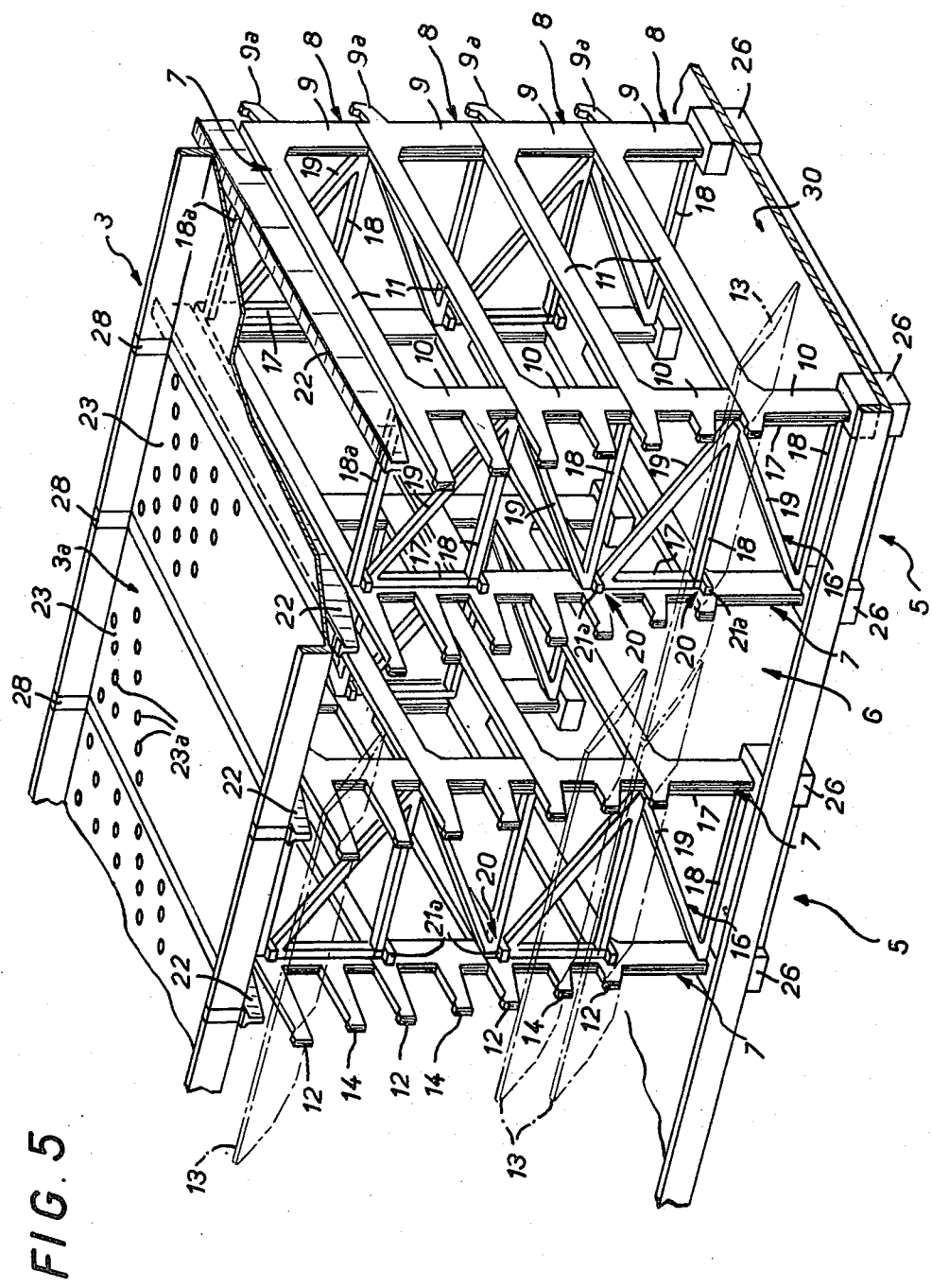
FIG. 5 is a perspective view from the exterior of two adjacent towers with the hot water supply basin partly broken away.

Another or intermediate louver is mounted on an intermediate cantilever 14 shorter in radial length than its superjacent cantilever 12 preferably about midway along the height of its upright 10. Preferably as best seen in FIGS. 3 and 5, the radial overhang of the cantilevers 12 and 14 gradually diminish in succession toward the bottom of the towers 5.

Consoles or cantilevers 9a project inwardly from the upper part of the uprights 9. These consoles 9a are shaped to receive channels adapted to mount screens which are a part of dispersion section per se.

The superposed portal frames of each radial side 7 of a tower 6 are bonded to one another by specific adhesion, for example, a nonshrinking plastics material or resin, applied between the lower edges of the uprights 9 and 10 and upper side of the cross member 11.

According to the invention between the radial sides 7 of the towers 5 is provided a triangulation or triangular bracing system 15 comprising a plurality of triangular bracing members 16 preferably of right triangular configuration.

Preferably, each such triangular bracing member or wind brace 16 of square section comprises a side 17 parallel to the corresponding radially outer or inner uprights 9, 10 and approximately the same height as the uprights 9, 10 interconnected, another side 18 being perpendicular to the associated uprights 9, 10 and extending the full distance between the opposed uprights 9, 10. The hypothenuses 16 of the right triangular bracing members 16 on successive levels of a tower 5 alternately slope in opposite directions as shown in FIGS. 2 and 5. On a given level of each tower 5 the hypothenuses of the bracing members 16 at the radially inner and outer sides slope in the same direction as shown or in opposite directions.

Finally above the uppermost triangular bracing member 16 is a horizontal beam 18a extending between the intersections of the uprights 9, 10 and the cross member 11.

The resulting structure withstands both traction and compression forces and defines a rigid central tower structure with wings permitting a certain degree of mobility.

The triangular bracing members 16 are fixed to their associated uprights 9, 10 at junction points 20 alternately at one radial side 7 and the other where the acute angles of superposed triangular bracing members 16 meet.

Radial profiled ledges 21 on the circumferentially inner sides of the opposed uprights 9, 10 of the towers 5 support the triangular bracing members 16 at their apices. The ledges 21 have horizontal surfaces for bearing at the right angle apex and appropriately inclined bearing surfaces for the other acute angle apices. Radially extending apical blocks 21a of appropriate cross section are provided at each of the apices of the triangular bracing members 16 and are adapted to bear on their corresponding profiled ledges 21. The triangular bracing members 16 are then bolted into place through their apical blocks to their respective ledges 21. The bearing surfaces of the bracing members and the ledges may of course be bonded with a suitable adhesive, this being preferred over in situ casted reinforced concrete joints.

The resulting towers are thus independent self-supporting and self-stabilized structures capable of withstanding earthquakes made basically of two different types of standardizable precast reinforced concrete elements.

Reference will now be had to the upper half of FIGS. 1, and FIG. 5 with regard to the raised, hot water supply basin 3 which is broken up into a plurality of independent part angular sections 3a separated by radial expansion joint 27. The perforate ribbed floor slabs of the supply basin 3 are supported by radial girders 22 (FIGS. 3, 4 and 5). These girders 22 in turn bear on relatively thin neoprene pads 25 of appropriate thickness (FIG. 4).

Owing to this arrangement the hot water supply basing 3 is separated from the actual support structure by the neoprene pads 25 which permit relative movements due to expansion and contraction of the various components of the structure.

The distribution of the neoprene bearing pads permits the transmission and distribution of forces, caused for example by earthquakes from the basin 3 to the radial sides 7 of the towers 5 of the support structure.

In FIG. 4 the details of the expansion joint 27 between two adjacent part annular sections 3a of the hot water supply basin 3 are best viewed. As seen in FIGS. 2 and 5 two adjacent floor slabs 23 are supported on a profiled girder 22 and joined together by a radial seam 28. As seen in FIG. 4 the expansion joint 27 is actually disposed between the seam 28 and one of the floor slabs 23 to permit expansion between two adjacent part annular sections 3a of the basin 3.

Of course the invention is not intended to be limited to the illustrated embodiment but on the contrary may encompass various modifications and alternatives which will be understood by those skilled in the art.

What is claimed is:

1. An induced draft cooling tower of the type comprising an annular outer support structure for supporting a similarly shaped dispersion section including a raised, hot water supply basin and an inner support structure concentric with the outer support structure for supporting a ventilation section, said outer support structure being essentially constructed of precast reinforced concrete elements and comprising a plurality of sector-shaped independent self-supporting and self-stabilized towers in an annular array, said towers having a pair of circumferentially spaced radial sides, each of said radial sides comprising a plurality of superposed portal frames, and triangular bracing members extending circumferentially between said pairs of radial sides of said towers.

2. The outer support structure according to claim 1, wherein said radial sides of each of said towers are embedded in a concrete foundation.

3. The cooling tower according to claim 1, wherein said bracing members are provided between radially inner and outer ends of pairs of said portal frames at the same level in said towers.

4. The cooling tower according to claim 3, wherein said portal frames comprise a radially inner and a radially outer upright connected by an upper cross member.

5. The cooling tower according to claim 4, wherein said upper cross members of said portal frames cantilever outwardly beyond their associated radial outer uprights to provide louver supports.

6. The cooling tower according to claim 5, further comprising intermediate cantilevers extending outwardly from said radially outer uprights below said first mentioned cantilevers to provide intermediate louver supports.

7. The cooling tower according to claim 5 or 6, further comprising precast reinforced concrete louvers supported on said cantilevers extending from said outer radial uprights of pairs of said portal frames at the same level in said towers.

8. The cooling tower according to claim 5 or 6, further comprising precast reinforced concrete louvers removably supported on said cantilevers.

9. The cooling tower according to claim 4, wherein said triangular bracing members are right triangles with one side parallel to said uprights of their associated portal frames and the other side perpendicular to said uprights of their associated portal frames.

10. The cooling tower according to claim 9, wherein the length of said one side of said right triangular bracing members is substantially equal to their associated uprights and the length of said other side of said right triangular bracing members being substantially equal to the distance between said uprights of said pairs of portal frames.

11. The outer support structure according to claim 10, wherein the slope of a said hypothenuse of its associated bracing member is opposite that of an immediately subjacent or superjacent said bracing member.

12. The cooling tower according to claim 9 or 11, wherein said right triangular bracing members are supported on radial ledges provided on circumferentially inner sides of said uprights.

13. The cooling tower according to claim 12, wherein said triangular bracing members have apical blocks for bearing on their respective radial ledges and are adapted to be bolted thereto.

14. The cooling tower according to claim 1, wherein said uprights of portal frames are bonded by specific adhesion to said cross member of their immediately subjacent portal frames.

15. The cooling tower according to claim 1, wherein said towers are circumferentially spaced from each other by a sector of substantially the same dimensions as that of said towers.

16. The cooling tower according to claim 1, wherein said hot water supply basin is supported by radial girders in alignment with said radial sides of said towers.

17. The cooling tower according to claim 1, wherein said hot water supply basin comprises a plurality of part annular sections supported on radial girders in alignment with said radial sides of said towers.

18. The cooling tower according to claim 17, further comprising expansion joints disposed between adjacent part annular sections of said supply basin.

19. The cooling tower according to claim 18, wherein each of said part annular sections spans two of said towers.

20. The cooling tower according to claim 1, wherein an annular roof is hung between said inner and outer support structures.

* * * * *